United States Patent
Ronen et al.

(10) Patent No.: US 8,055,004 B2
(45) Date of Patent: Nov. 8, 2011

(54) FIBER OPTIC EARPIECE TO REDUCE RADIATION TRANSMITTED TO A CELL PHONE USER

(76) Inventors: Amit J Ronen, Mountain View, CA (US); Alon Konchitsky, Cupertino, CA (US)

( * ) Notice: Subject to any disclaimer, the term of this patent is extended or adjusted under 35 U.S.C. 154(b) by 820 days.

(21) Appl. No.: 12/136,532

(22) Filed: Jun. 10, 2008

(65) Prior Publication Data
US 2008/0311967 A1    Dec. 18, 2008

Related U.S. Application Data

(60) Provisional application No. 60/944,172, filed on Jun. 15, 2007.

(51) Int. Cl.
H04M 1/00 (2006.01)
H04M 9/00 (2006.01)
H04R 25/00 (2006.01)

(52) U.S. Cl. .................................. 381/370; 379/430

(58) Field of Classification Search ............ 381/370, 381/376, 384, 189; 379/437, 451, 447, 430; 455/90.3, 117, 575.5, 575.2; 250/505.1; 361/814, 816, 818
See application file for complete search history.

(56) References Cited

U.S. PATENT DOCUMENTS

| | | | |
|---|---|---|---|
| 5,336,896 A | 8/1994 | Katz | |
| 5,657,386 A | 8/1997 | Schwanke | |
| 2002/0086715 A1 * | 7/2002 | Sahagen | 455/568 |

OTHER PUBLICATIONS

EM Interaction of Handset Antennas and a Human in Personal Communication, Proceedings of the IEEE, vol. 83, No. 1, Jan. 1995.

* cited by examiner

*Primary Examiner* — Tuan Nguyen
(74) *Attorney, Agent, or Firm* — Steven A. Nielsen; Allman & Nielsen, P.C.

(57) ABSTRACT

An earpiece using optical fiber shields the human brain from radio frequency radiation generated by wireless phones and similar radio devices. The disclosed device and method prevents unwanted exposure to potentially harmful radiation and provides an enhanced communication path between a cell phone and ear-piece.

3 Claims, 5 Drawing Sheets

FIBER OPTIC EARPIECE TO REDUCE RADIATION TRANSMITTED TO A CELL PHONE USER

CROSS REFERENCE TO A RELATED APPLICATION

This application claims the benefit of U.S. provisional application Ser. No. 60/944,172 filed on Jun. 15, 2007 and entitled "Fiber-optic earpiece to reduce cell phones' harmful radiation effects" and incorporates by reference the entire contents of said application.

BACKGROUND OF THE INVENTION

1. Field of the Invention

The invention generally relates to wireless phone technology. More particularly, the invention relates to a protective, radiation free earpiece to protect the user from RF energy radiation emanating from a phone apparatus and to provide an enhanced, high-quality communication signal between the cell phone and an earpiece.

2. Description of the Related Art

In the past, there have been several attempts to protect cellular phone users from RF radiation. But none of the approaches have been entirely satisfactory. One such protective device for cell phone users is illustrated in Katz U.S. Pat. No. 5,336,896, wherein the entire cell phone, including the antenna is placed in a shielding enclosure. The cell phone antenna is retracted into the shielding enclosure and makes contact with a second antenna outside the shielding enclosure. The second antenna is mounted away from the user's head to reduce exposure to the radiation emanating from it. Though the energy level is reduced to a certain extent, the user's head is still directly exposed to the radiation.

Schwanke, U.S. Pat. No. 5,657,386 discloses a cellular phone having a shield for protecting the user from electromagnetic radiation emanating from the antenna. The shield is pivotally mounted to the housing of the cell phone and it can be positioned between the antenna and the head of the user's phone. But this approach shields only that portion of the antenna extending upwardly outside of the cell phone housing. The portion of the antenna inside the cell phone housing does not have any of the shield structure blocking radiation.

A cellular telephone user's level of exposure to RF radiation depends upon several factors. These factors include the: amount of cellular telephone traffic, quality of the transmission, how far the antenna is extended, and size of the handset. A cellular telephone's main source of RF energy is its antenna. Therefore, the closer the antenna is to the head, the greater a person's expected exposure to RF radiation. The amount of RF radiation absorbed decreases rapidly with increasing distance between the antenna and the user. The antenna of hand-held cellular telephones is in the handset, which is typically held against the side of the head while the phone is in use. The antenna of a car cellular telephone is mounted on the outside of the car, some distance from the user.

Since radiation decreases exponentially (one over the square root over the distance between the operator and the phone), it is normally assumed that by using a headset, which has copper wires inside, and holding the phone away from the body would solve the problem. However, recent investigations reveal that headsets may actually intensify exposure to harmful EMFs emitted by a cell phone. Contrary to popular belief, research has shown that hands-free cell phone kits can significantly increase the user's brain exposure to radiation. The findings confirmed claims that that using hands-free earpieces in certain positions could more than triple the brain's exposure to radiation compared to a conventional cell phone call. By itself, a headset can act as an antenna that actually channels radiation to your brain.

Wireless headsets are even worse, because the wire is replaced with a transmitter and receiver operating with low power at frequency levels between 900 MHz. to 2.4 GHz. The maximum frequencies for wireless products compliant with Bluetooth specifications are 2.497 GHz. The frequency power of wireless headsets rivals that of microwave ovens, which also operate at 2.4 GHz. And, while in a few cases emission may be lessened by the use of a headset or earpiece, it may not reduce radiation enough. This means that even a product that offers up to 70 percent reduction in EMR is not nearly as effective as necessary.

Bluetooth phones could be under attack from a new technique, even when the handset's security features are switched on. Using specialized equipment the attacker can connect to a Bluetooth handset without authorization and then make calls, siphon off information or listen in on data transfers between the device and, for example, a PC. Some security firms recommend financial traders avoid Bluetooth handsets because of the potential attack. Firstly, confidential data can be obtained, anonymously, and without the owner's knowledge or consent, from some Bluetooth enabled mobile phones. This data includes, at least, the entire phonebook and calendar, and the phone's IMEI.

Secondly, it has been found that the complete memory contents of some mobile phones can be accessed by a previously trusted ("paired") device that has since been removed from the trusted list. This data includes not only the phonebook and calendar, but media files such as pictures and text messages. In essence, the entire device can be "backed up" to an attacker's own system. Thirdly, access can be gained to the phone's command set, giving full access to the higher level commands and channels, such as data, voice and messaging.

SUMMARY OF THE INVENTION

The present invention provides unexpected results and overcomes shortfalls in the related art such as the problems associated with human exposure to radiation during radio telephone use. The invention also provides, inter alia, means to enhance the signal quality between a phone and ear piece. One embodiment of the invention includes an optical fiber ear piece that connects the phone to the ear and shields the radio RF radiation which is directed toward the user. As there is no external interference, the optical fiber also enhances the signal quality. An object of the present invention is to provide new and useful radiation blocking apparatus. Another object of the present invention is to provide new and useful apparatus for portable telephones and wireless communication apparatus to block electromagnetic radio frequency radiation from reaching the user of such apparatus.

Another object of the present invention is to provide a hand-held cellular telephone that is effective for radio communication with a remote receiver, such as an orbiting satellite or a ground-based antenna receiver. Yet another object of the present invention is to provide an ear piece preventing unwanted exposure of transmitted radiation from the hand-held radio telephone, while allowing the transmission of a radiation signal to a remote receiver, such as an orbiting satellite. A further objective of the present invention is to provide an optical fiber earpiece having the capability of enhancing the speech quality.

Most of the studies conducted on cellular telephone use and cancer risk have focused on hand-held models, since they deliver the most radio frequency ("RF") radiation to the user. RF radiation can be harmful at high levels because it produces heat in the medium it enters, similar to that of a microwave oven. The heat produced by RF radiation from hand-held cellular telephones may, in the view of some, be associated with brain tumors, because the antenna is held close to the user's head.

Cell phones operate with low-power transmitters. A handheld cell phone operates on about 0.75 to 1 watt of power. The position of a transmitter inside a phone varies depending upon the manufacturer, but it is usually in close proximity to the phone's antenna. The radio waves that send the encoded signal are made up of electromagnetic radiation propagated by the antenna. The function of an antenna in any radio transmitter is to launch the radio waves into space; in the case of cell phones, these waves are picked up by a receiver in the cell-phone tower.

When talking on a cell phone, most users place the phone against their head. In this position, there is a good chance that some of the radiation will be absorbed by human tissue. Radiation can damage human tissue if it is exposed to high levels of RF radiation. RF radiation has the ability to heat human tissue, much like the way microwave ovens heat food. Damage to tissue can be caused by exposure to RF radiation because the body is not equipped to dissipate excessive amounts of heat. The eyes are particularly vulnerable due to the lack of blood flow in that area.

The added concern with non-ionizing radiation, the type of radiation associated with cell phones, is that it could have long-term effects. Although it may not immediately cause damage to tissue, there is uncertainty as to whether prolonged exposure could create problems. This is an especially sensitive issue today, because more people are using cell phones than ever before. The following illnesses and ailments that have potential links to cell-phone radiation: cancer, brain tumors, Alzheimer's, Parkinson's, fatigue, headaches and others.

The present invention relates to wireless phones including, but not limited to cellular telephones, digital telephones, analog telephones, PCS telephones and other personal communication systems. These systems generate radio frequency radiation, including an electromagnetic field ("EMF"), which may prove harmful to persons exposed to such radiation. In recent years, as the number of wireless phones has grown, so has the concern about tumors or other damage to the brain. Although the level of radiation emitted by such devices is relatively moderate, the antenna which emits the radiation is close to the head. There is also concern that such radiation can have a cumulative effect.

The position of the cell phone antenna usually extends from the top surface of the telephone case and/or is disposed on the inside of the telephone case, in close proximity with the biological tissue of the user's hand and head as it transmits electromagnetic radiation. It has been determined that the presence of the biological tissue alters the radiation pattern and reduces the antenna gain, and, that between 48 to 68% of the power delivered to the antenna of a hand-held cellular telephone is absorbed by the head and hand of the user (see, *EM Interaction of Handset Antennas and a Human in Personal Communications, Proceedings of the IEEE*, Vol. 83, No. 1, January 1995). The power absorbed by the head and hand reduces the strength of the radiation signal emitted from the antennas for communication.

In addition, by requiring the antenna to output a stronger signal, the power absorbed by the head and hand decreases the usable life of the battery of the cellular telephone. Further, contemporary inquiries are investigating the possibilities that the radiation absorbed by the head and hand may cause cancer or create other health risks or hazards to the user in association with the use of such apparatus. Research is only now being done looking into the potential link between cellular telephone usage and detrimental biological effects, such as brain tumors. In response to the anticipated consumer demand, and to provide protection against health risks, the apparatus of the present invention utilizes an ear-piece made of fiber-optic to protect the user from the potentially harmful radiation emissions from the wireless communication apparatus. In addition, the fiber-optic ear-piece provides an enhanced, high-quality signal between the wireless device and ear.

An objective of the present invention is to provide protection to the human brain from the antenna and related transmitting elements of portable telephones and other wireless communication apparatus. The fiber-optic ear-piece blocks the microwave radio frequency radiation that is directed toward the user of the apparatus, and allows the signal to be enhanced with the usage of the ear-piece. Another objective of the present invention is to provide a new and useful radiation blocking apparatus.

Yet another objective of the present invention is to provide new and useful apparatus for a hand-held cellular telephone that is effective for radio communication with a remote receiver, such as an orbiting satellite or a ground-based antenna receiver. Yet another objective of the present invention is to provide an antenna assembly capable of preventing unwanted exposure of transmitted radiation from the inventive hand-held radio telephone, while allowing the transmission of a radiation signal to a remote receiver, such as an orbiting satellite. A further objective of the present invention is to provide such a hand-held radio telephone and antenna assembly having signal enhancing capabilities of the signal. It is an objective of the invention to protect users of radio equipment from harmful electromagnetic radiation emitted from the antenna assembly which is located in close proximity to the body of the user and especially in close proximity to the head of the user. The present invention shields the human body from the radiation and produces an enhanced signal.

DETAILED DESCRIPTION OF THE INVENTION

Figure 1:
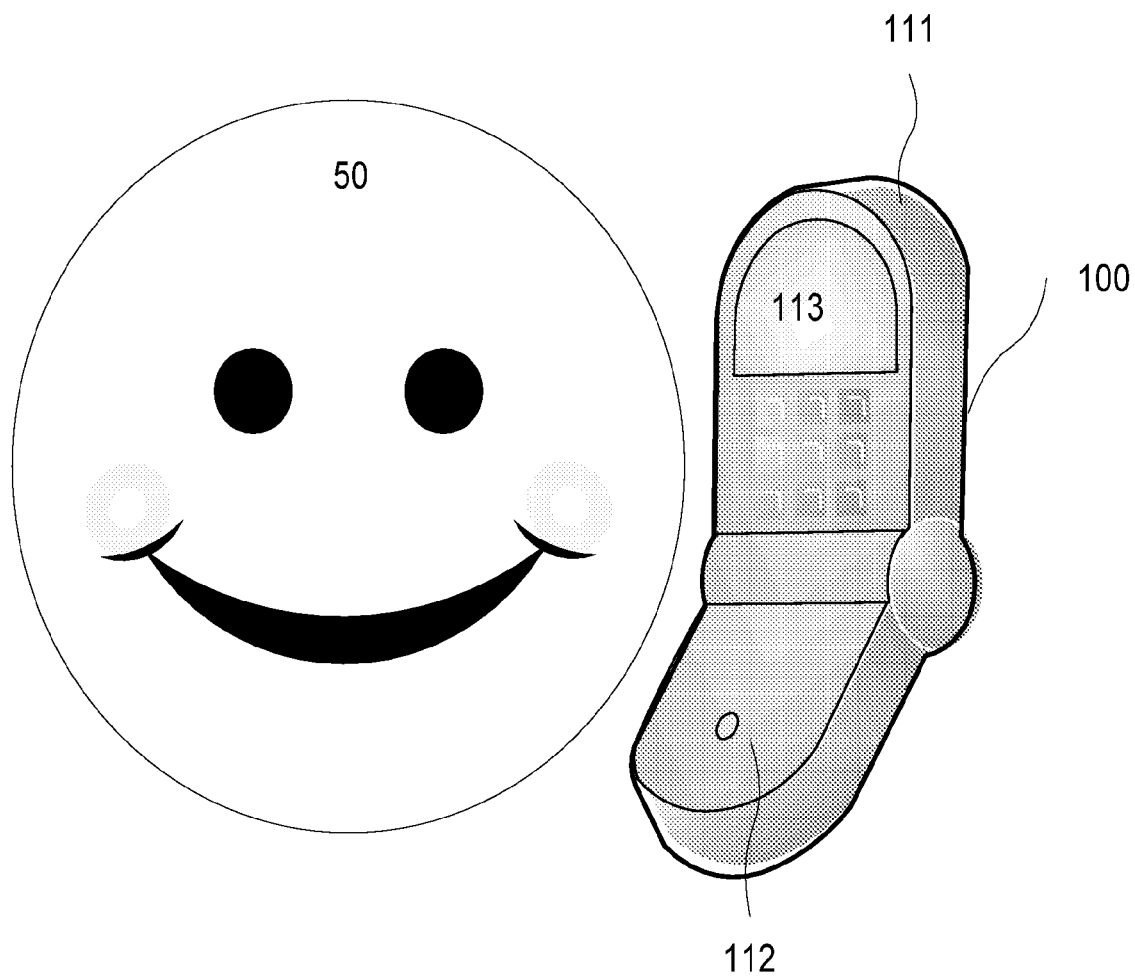
FIG. 1 shows a prior art conventional cellular telephone in use.

FIG. 1 shows a typical configuration in the related art for a hand-held cellular phone 100, commonly known as flip-phone. A mouthpiece 112 is flipped downward in the open position so that when the hand-held cellular phone is appropriately positioned by a user 50, the ear piece 113 is adjacent to the user's ear, while the mouthpiece 112 is adjacent to the user's mouth. An antenna 111, which may be telescoping or fixed, is disposed externally on the phone body. The antenna 111, which may include an antenna disposed inside the telephone case, emits electromagnetic radiation to send communication signals from the hand-held cellular phone to a distant ground-based cell of a cellular network, and receives electromagnetic radiation carrying communication signals from the cell. Thus, the user is able to communicate through the cellular network to the hard wire telephone network, or other receivers via radio signals transmitted from the cell. However, the antenna 111 of a conventional hand-held radio telephone emits a radiation signal that exposes the user to the health risks now being associated with exposure to electromagnetic radiation in the cellular frequency band.

Figure 2:
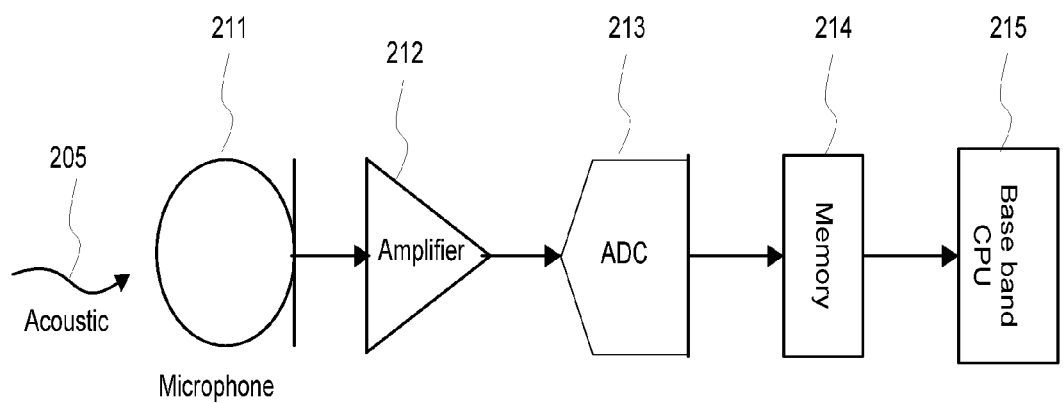
FIG. 2 is a schematic diagram of the prior art showing the typical path of an analog signal received at the microphone in a cell phone.

FIG. 2 shows the typical path of the analog signal received at the microphone in cell phone of the related art. The microphone, 211, receives an acoustic signal 205. The signal from the microphone 211 is amplified using the amplifier 212. The analog acoustic signal from the amplifier is converted into a digital signal at ADC block 213. The digital signal is stored in memory 214. The stored digital signal is processed in the base band CPU 215 and transmitted over the network.

Figure 3:
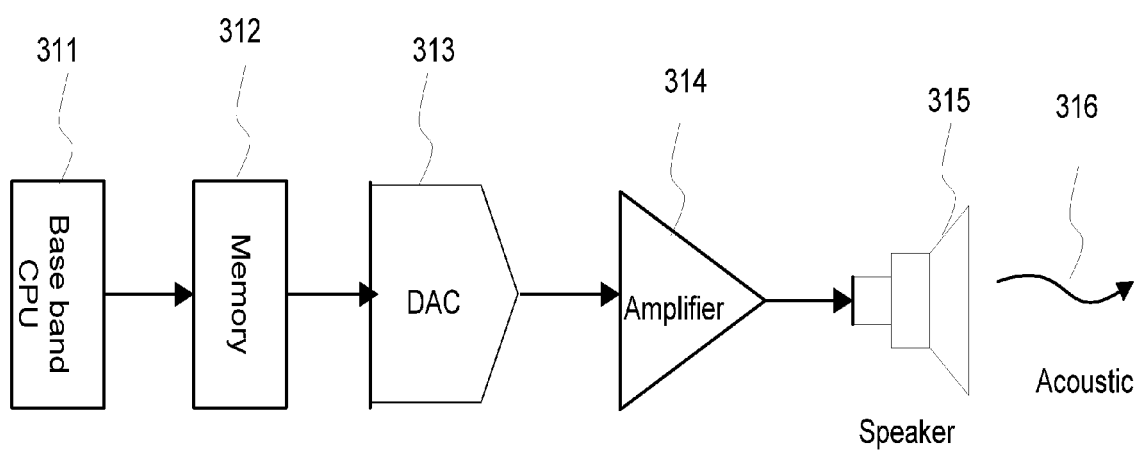
FIG. 3 is a schematic diagram of the prior art showing the typical path of a signal received from the other end, from the base band CPU to the speaker.

FIG. 3 shows the typical path in the related art of a signal received from the other end, from CPU to the cell phone's speaker. The signal received is processed in the baseband CPU 311. The processed signal is stored in memory 312. The digital signal stored in memory is converted to an analog signal using a DAC 313. The analog signal should be amplified using an amplifier 314 before entering the speaker 315. The speaker produces acoustic wave 316.

Figure 4:
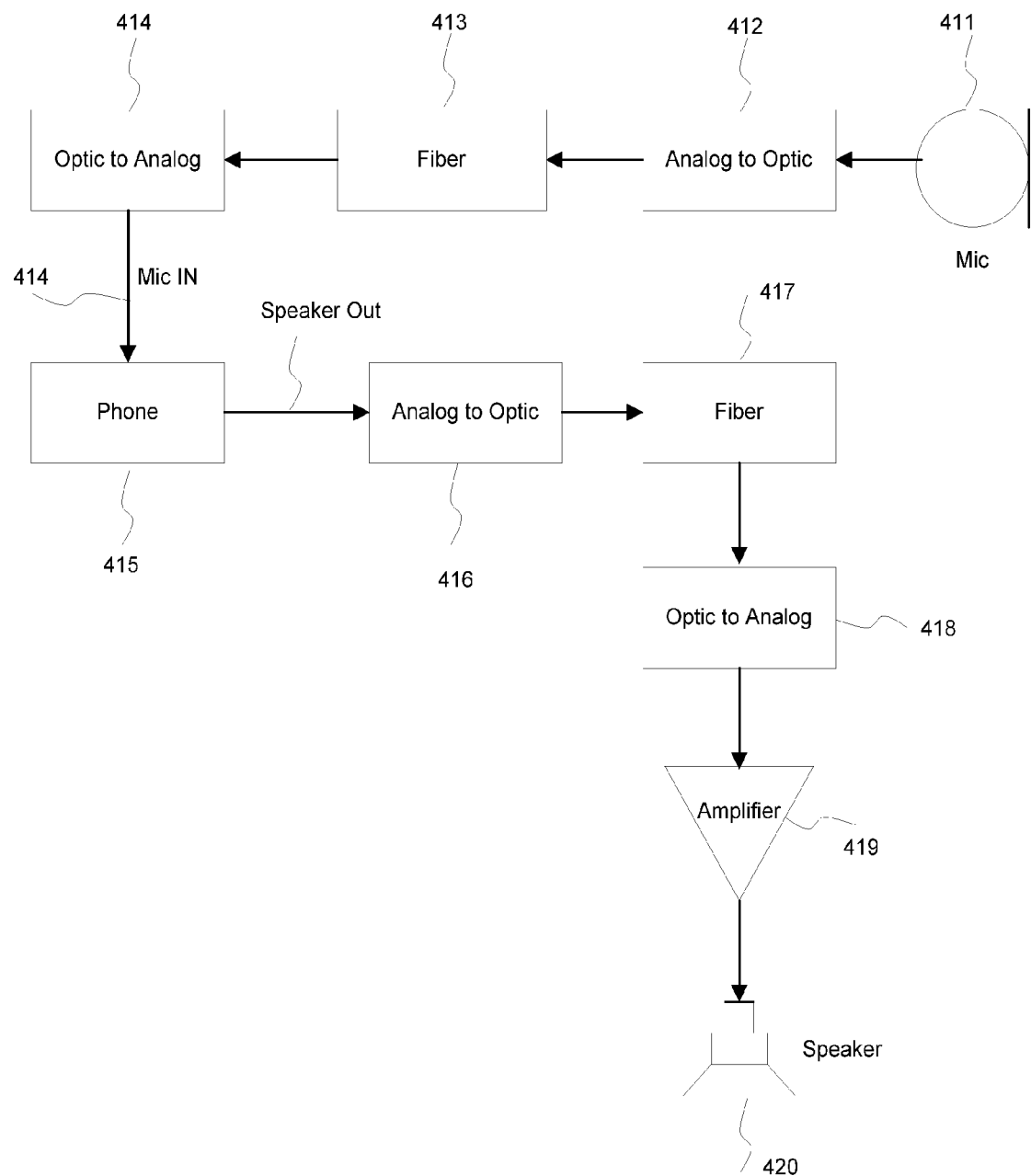
FIG. 4 is a schematic diagram showing the communication path of the signal for an embodiment of a system consistent with the principles of the invention.

FIG. 4 shows the communication path of the signal produced by a system constructed in accordance with the principles of the present invention. The acoustic signal from the operator's mouth is received by the fiber-optic ear-piece's microphone 411. Analog to optic component 412 converts the analog signal to an optical signal. The optical signal is transmitted through a fiber optic component 413. The optical signal is converted back to an analog signal at optic to analog converter 414, for processing at the phone 415. 414 is the microphone input for the phone and is disabled when the fiber-optic ear-piece is plugged in. The signal is processed using the circuitry inside the phone 415. The processed analog signal is converted to an optical signal at converter 416 and the optical signal is then transmitted to the fiber optic ear piece 417. The optical signal is again converted to analog signal at converter 418. The analog signal is amplified using amplifier 419. The amplified analog signal is sent to the speaker 420 of the ear-piece.

Figure 5:
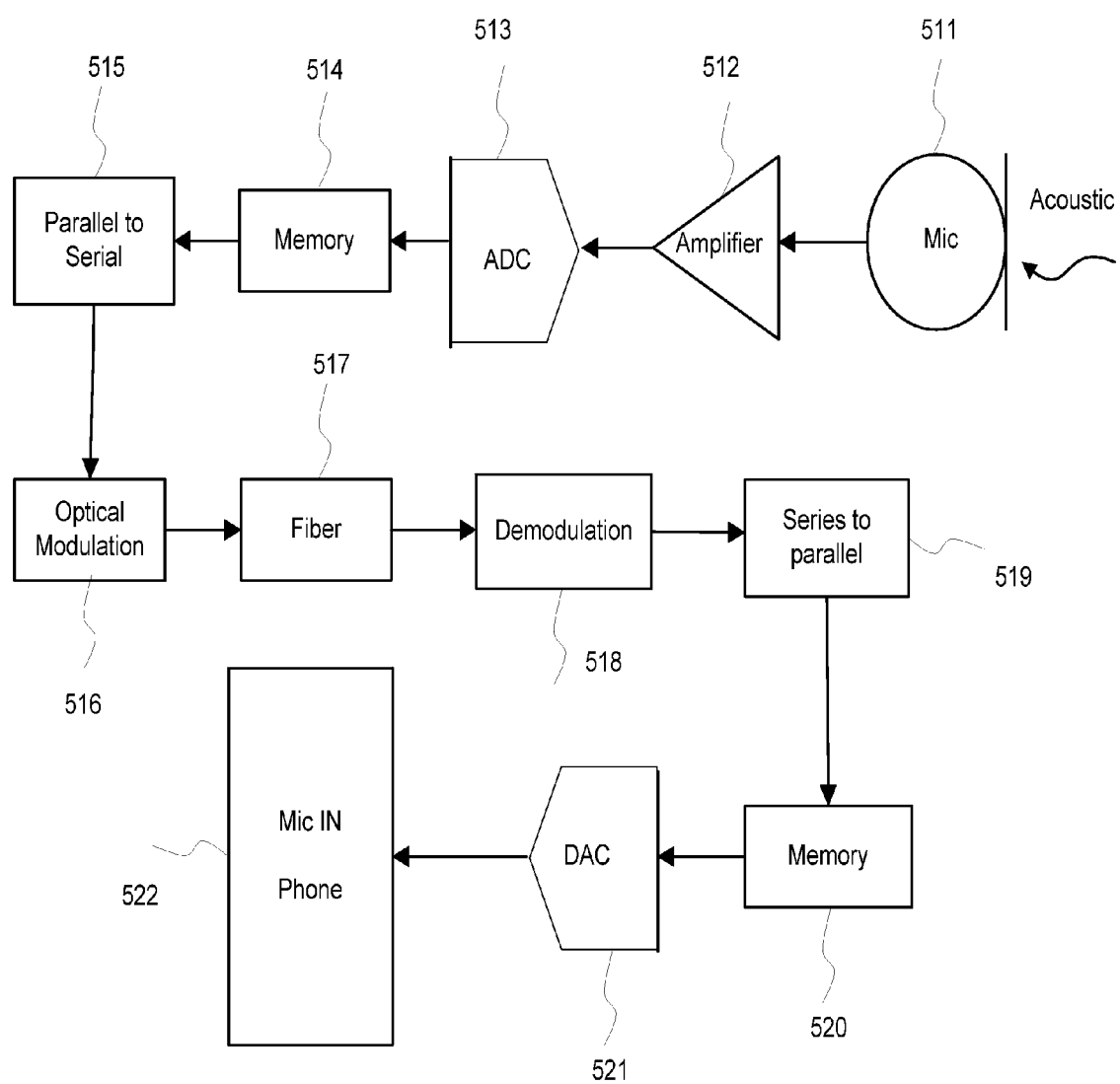
FIG. 5 is a schematic diagram showing in greater detail the communication path of the signal in a fiber-optic ear-piece constructed in accordance with the principles of the invention.

FIG. 5 shows the detailed communication path of the signal in a fiber-optic ear-piece constructed in accordance with the principles of the present invention. The acoustic signal from the operator's mouth is received by the fiber-optic ear-piece's microphone 511. The analog signal is amplified using amplifier 512. ADC block 513 converts the analog signal to a digital signal. The converted digital signal is stored in the memory 514 of the phone. The memory is converted from parallel to serial at converter 515. The serial data is modulated optically within optical modulation block 516 and then passed through optical fiber medium 517. The modulated signal is then demodulated at demodulation component 518. The signal is then converted from serial to parallel at converter 519. The converted data is stored in the memory module 520. The digital signal is then converted to analog signal using DAC 521. The analog signal is then passed into the microphone input of the phone 522.

With respect to the above description, it is realized that the optimum dimensional relationships for parts of the invention, including variations in size, materials, shape, form, function and manner of operation, assembly and use, are deemed readily apparent and obvious to one skilled in the art. All equivalent relationships to those illustrated only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention.

What is claimed is:

1. A microphone assembly for use with an earpiece assembly, the microphone assembly comprising:
   a) a microphone;
   b) an amplifier;
   c) an analog to digital converter;
   d) a memory chip;
   e) a parallel to serial converter;
   f) means of optical modulation;
   g) an optical fiber medium;
   f) means of demodulation;
   g) a series to parallel converter;
   h) a second memory chip;
   i) a digital to analog converter;
   k) means of inputting a signal into the microphone in component of a phone;
wherein the earpiece assembly is for use in shielding the human brain from harmful effects of radio frequency (RF) and electromagnetic (EM) radiation, the earpiece assembly comprising:
   a) a microphone;
   b) an analog to optic converter;
   c) an optical fiber transmission medium;
   d) an optic to analog converter;
   e) a connection assembly capable of entering a phone or a microphone in component;
   d) means of accepting a Speaker Out signal from a phone;
   e) a second analog to optic converter;
   f) a second optical fiber transmission medium;
   a) a second optic to analog converter;
   h) an amplifier; and
   i) a speaker.

2. A method of constructing a communication path within an earpiece, the method comprising:
   a) the use of a microphone to receive an analog signal;
   b) the use of amplifier to amplify the analog signal;
   c) the use of an ADC block to convert the analog signal to a digital signal;
   d) the use of a memory chip to store the digital signal;
   e) the use of a parallel to serial converter to convert the contents of the memory chip to a serial format;
   f) the use of optical modulation to modulate the contents of the digital signal in serial format;
   g) the use of a fiber optic medium to carry the digital signal;
   h) the use of demodulation upon the digital signal;
   i) the use of a series to parallel converter upon the digital signal;
   j) the use of a second memory chip to store the digital signal in a parallel format; and
   k) the use of a DAC block to convert the contents of the second memory chip into an analog format.

3. The method of claim 2 including the use of a microphone-in apparatus to accept the analog output from the second memory chip.

\* \* \* \* \*